(12) United States Patent
Kobayashi

(10) Patent No.: US 6,441,909 B1
(45) Date of Patent: Aug. 27, 2002

(54) PATTERN PROJECTION MEASUREMENT GRATING

(75) Inventor: Fumio Kobayashi, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/354,105

(22) Filed: Jul. 15, 1999

(30) Foreign Application Priority Data

Sep. 29, 1998 (JP) .......................................... 10-275122

(51) Int. Cl.[7] .............................................. C01B 11/14
(52) U.S. Cl. .................................. 356/604; 250/237 G
(58) Field of Search ....................... 356/604; 250/237 G

(56) References Cited

U.S. PATENT DOCUMENTS 5,450,204 A * 9/1995 Shigeyama et al. ......... 356/604
5,604,345 A * 2/1997 Matsuura ................ 250/237 G

* cited by examiner

Primary Examiner—Richard A. Rosenberger
(74) Attorney, Agent, or Firm—Snider & Associates; Ronald R. Snider

(57) ABSTRACT

In a pattern projection measurement grating, each cycle of the total amplitude of a sine wave is divided into eight sections, and each of thus divided sections is divided into white regions W and black regions B according to the ratio between the area S of the sine wave and the area So of a rectangular wave having the same amplitude as the sine wave in this section, so as to constitute a black and white binary pattern. Thus obtained pseudo sine wave density distribution is a density pattern close to the sine wave.

5 Claims, 6 Drawing Sheets

$$d_z = d_{n=3} \cdot Z/Z_{n=3}$$

$$d_z = 2a \cdot Z/Z_{n=3}$$

PATTERN PROJECTION MEASUREMENT GRATING

RELATED APPLICATIONS

This application claims the priority of Japanese Patent Application No. 10-275122 filed on Sep. 29, 1998, which is incorporated herein by reference.

BACKGROUND OF THE INVENTION

1. Field of the Invention

The present invention relates to a grating for measuring a pattern projection, which is used in a moire apparatus or the like.

2. Description of the Prior Art

Moire apparatus have conventionally been known as apparatus for easily capturing three-dimensional information of an object to be measured in a short period of time. The moire apparatus include those of a grating irradiation type and a grating projection type. The latter would have a higher degree of flexibility in measuring the object to be measured since they need no reference grating as in the former.

The grating projection type moire apparatus comprises a projection optical system and an observation optical system which have their respective optical axes parallel to each other; and is configured such that the projection optical system projects an image of a projection grating onto the object to be measured, the deformed grating image formed on the object is focused onto an observation reference grating by the observation optical system, and the resulting moire fringe is observed.

From the viewpoint of enhancing the accuracy in observing the moire fringe, it is desirable that a grating having a density distribution as closer as possible to a sine wave be employed as the above-mentioned projection grating and observation grating.

For realizing this feature, a pattern projection measurement grating having a pseudo sine wave density distribution constituted by a black and white binary pattern is considered. In this specification, "white" in "black and white binary pattern" refers to "transparent" whereas "black" refers to "opaque."

Possible examples of the method of making a pattern projection measurement grating having a pseudo sine wave density distribution such as that mentioned above include a method comprising the steps of placing a platemaking screen over a sine wave density distribution pattern so as to change the latter to a black and white binary pattern in which areas of the black and white dots vary, and then reducing thus obtained pattern to an actual grating size; and a method in which, though a black and white binary pattern is formed by black and white dots, the dots are formed randomly, while random numbers are generated in a computer so as to form a function for carrying out dot distribution control, and are drawn such that the dot distribution is formed like a sine wave.

In any of the cases where the above-mentioned methods are employed, it is hard to make a pattern projection measurement grating having a preferable pseudo sine wave density distribution.

Namely, in the above-mentioned methods, black parts get darker (opaque parts become darker) since the influence of diffraction and the like cannot be taken into consideration, whereas white parts get brighter due to the minimum black dot dimensions that can be made, whereby the resulting pattern would basically look like an enlarged silver halide photograph.

SUMMARY OF THE INVENTION

In view of such circumstances, it is an object of the present invention to provide a pattern projection measurement grating having a pseudo sine wave density distribution constituted by a black and white binary pattern, in which the pseudo sine wave density distribution can be made as a density distribution close to a sine wave.

The projection measurement grating in accordance with the present invention is a pattern projection measurement grating having a pseudo sine wave density distribution constituted by a black and white binary pattern, wherein predetermined sections dividing each cycle of a total amplitude of a sine wave are provided, each section being divided into black and white regions according to a ratio between the area of the sine wave and the area of a rectangular wave having the same total amplitude as that of the sine wave in this section, so as to constitute the black and white binary pattern.

Preferably, in this case, the black and white binary pattern is formed with a density which cannot be resolved by a resolving power of a projection measurement lens.

Also, it is preferred that the black and white regions be divided by forming a black or white band-like region which passes near a center of gravity of a differential region between the rectangular wave and the sine wave.

Preferably, the black and white binary pattern is set to a pattern symmetrical about a position at $\pi$, in which black and white are inverted about positions at $\pi/2$ and $3\pi/2$.

Further, it is preferred that the black and white regions be divided like a band, whereas the white region has a width corrected, according to the degree of diffraction of light transmitted through the white region, to a width greater than the width set by the above-mentioned ratio.

DESCRIPTION OF THE PREFERRED EMBODIMENTS

In the following, preferred embodiments of the present invention will be explained with reference to the accompanying drawings.

Figure 1:
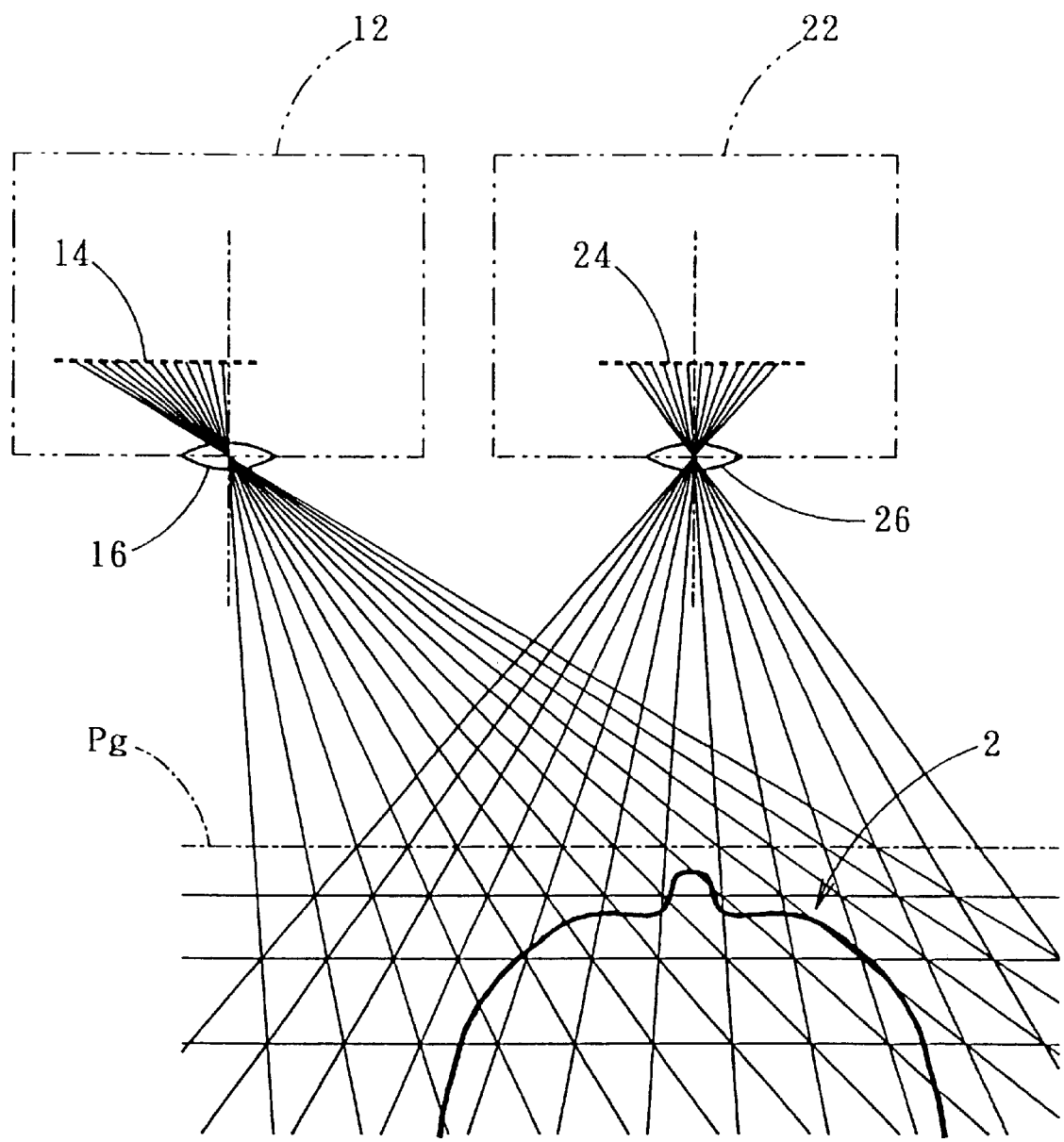
FIG. 1 is a schematic plan view showing a moire apparatus equipped with a pattern projection measurement grating in accordance with an embodiment of the present invention.

FIG. 1 is a schematic plan view showing a moire apparatus equipped with a pattern projection measurement grating in accordance with an embodiment of the present invention.

As depicted, the moire apparatus is configured such that a projection optical system 12 projects an image of a projection grating 14 through a projection lens 16 onto an object to be measured 2, and the deformed grating image formed on the object 2 is focused by an observation optical system 22 onto an observation reference grating 24 through a taking lens 26, so that the resulting moire fringe is observed.

In this drawing, a virtual reference grating plane Pg indicated by a dash-single-dot line and a plurality of planes parallel thereto indicated by solid lines form moire planes, and moire fringes are formed along a curve on which these individual moire planes and the object 2 intersect. Though this drawing shows moire planes only in front of the virtual reference grating plane Pg, a plurality of moire planes are formed on the rear side of the virtual reference grating plane Pg as well. Therefore, moire fringes are also formed when the object 2 is placed across the virtual reference grating plane Pg.

While the projection grating 14 and the observation reference grating 24 function as a pattern projection measurement grating in this embodiment, the projection grating 14 will be explained as their representative in the following since they have configurations similar to each other.

Figure 2A:
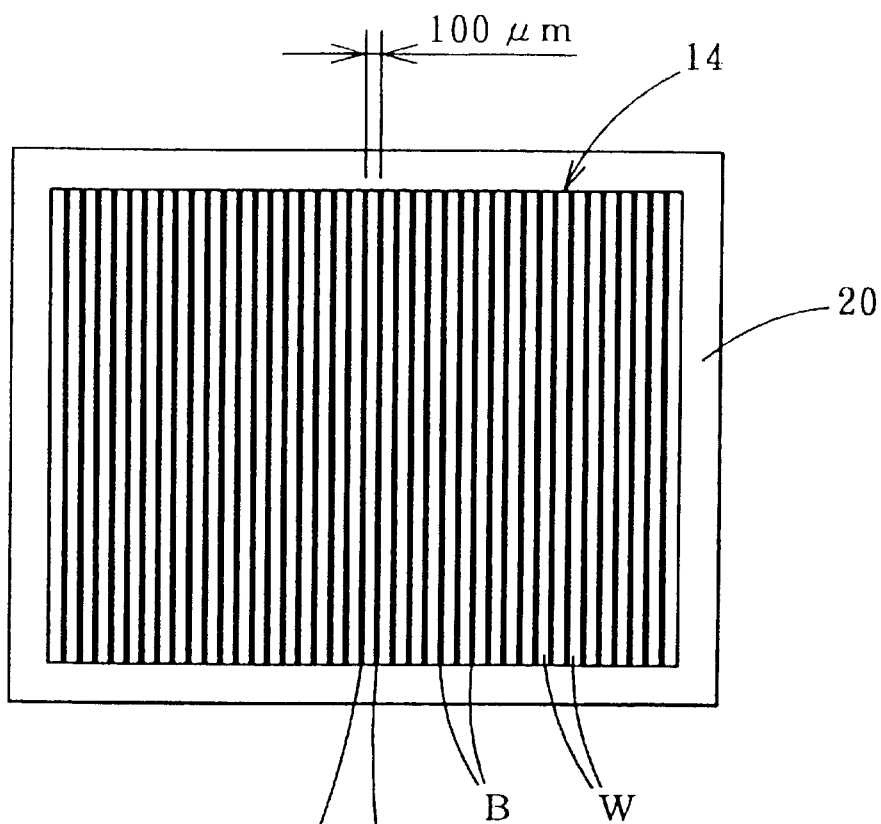
FIGS. 2A and 2B are front views showing the above-mentioned pattern projection measurement grating in detail.
Figure 2B:
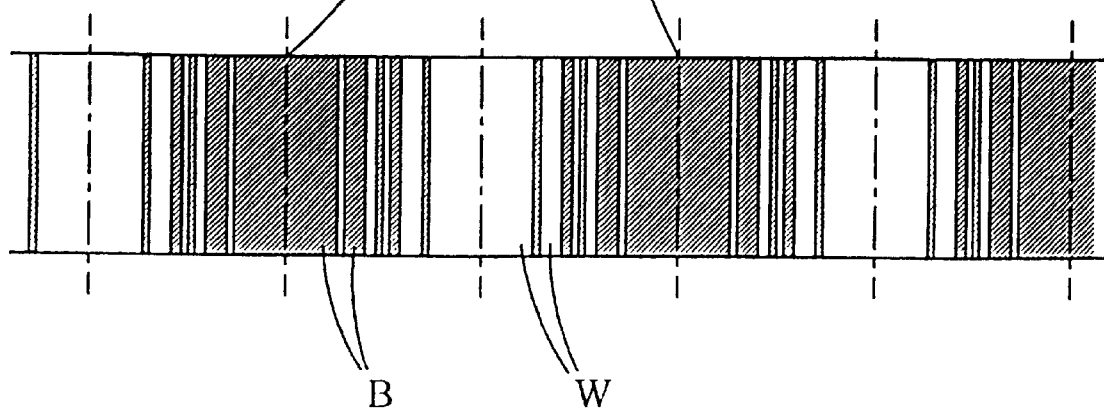

FIG. 2A is a front view showing the projection grating 14 together with its support frame 20, whereas FIG. 2B is its partly enlarged view.

Macroscopically, the projection grating 14 is formed like vertical stripes with identical horizontal pitches as shown in FIG. 2A. Microscopically, however, it is constituted by a repetitive black and white binary pattern whose horizontal width and interval gradually change as shown in FIG. 2B. In this black and white binary pattern, white regions W are transparent regions, whereas black regions B are opaque regions.

Figure 3:
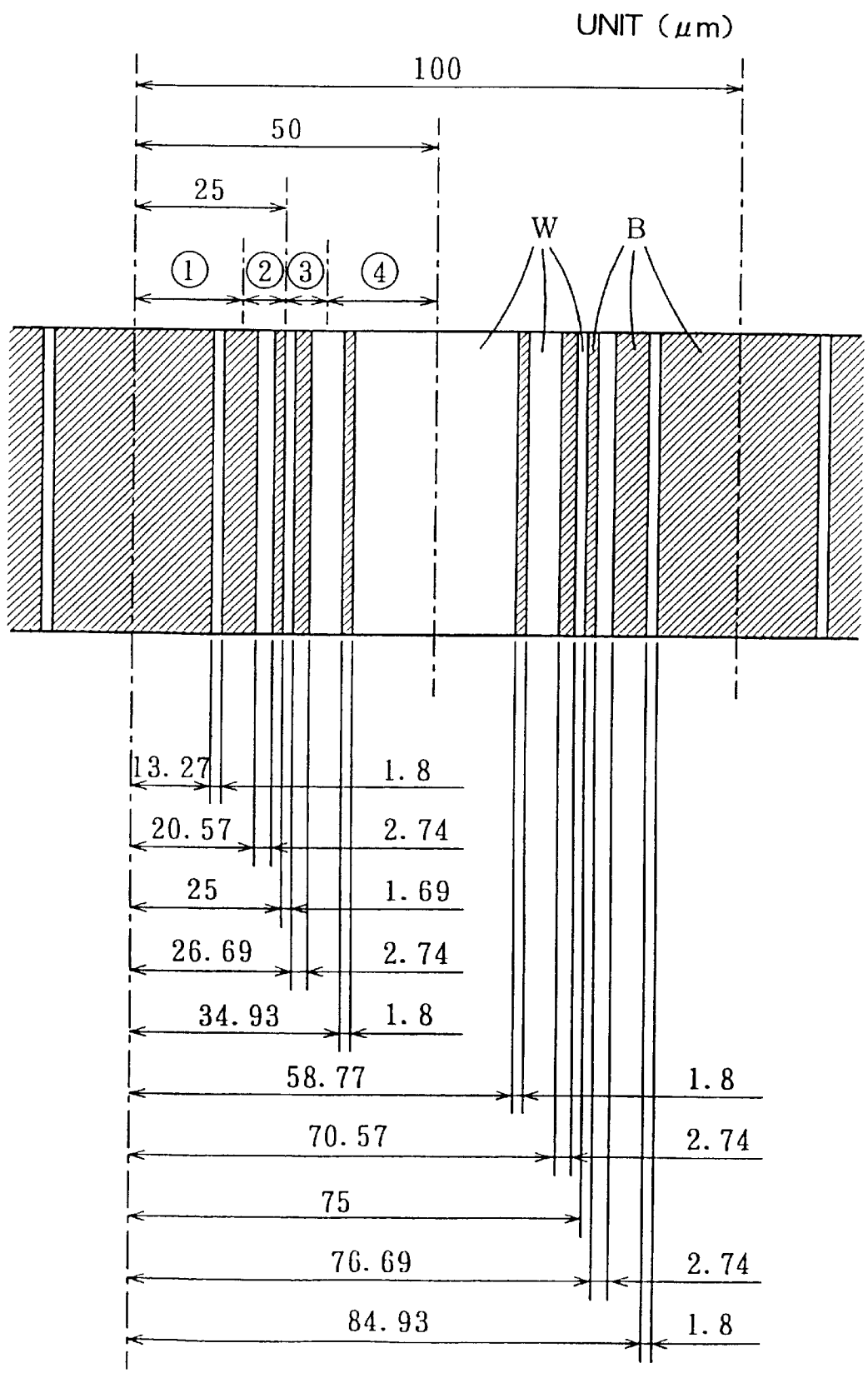
FIG. 3 is a view showing in detail the configuration of a black and white binary pattern in the pattern projection measurement grating of FIGS. 2A and 2B.

The repetitive pattern pitch in the black and white binary pattern is set to 100 $\mu$m, whereas the specific dimensional values for dividing the white regions W and black regions B within each pitch are set as shown in FIG. 3. As a consequence, the denseness in black and white binary pattern is distributed like substantially a sine wave form, whereby a density distribution (pseudo sine wave density distribution) approximating a sine wave is obtained. As depicted, the black and white binary pattern is formed with such a density that the width of each of its constituent white regions W and black regions B is less than 30 $\mu$m at most, so as not to be resolved by the resolving power of the projection lens 16.

A specific setting method for dividing the white regions W and black regions B will now be explained.

Figure 4:
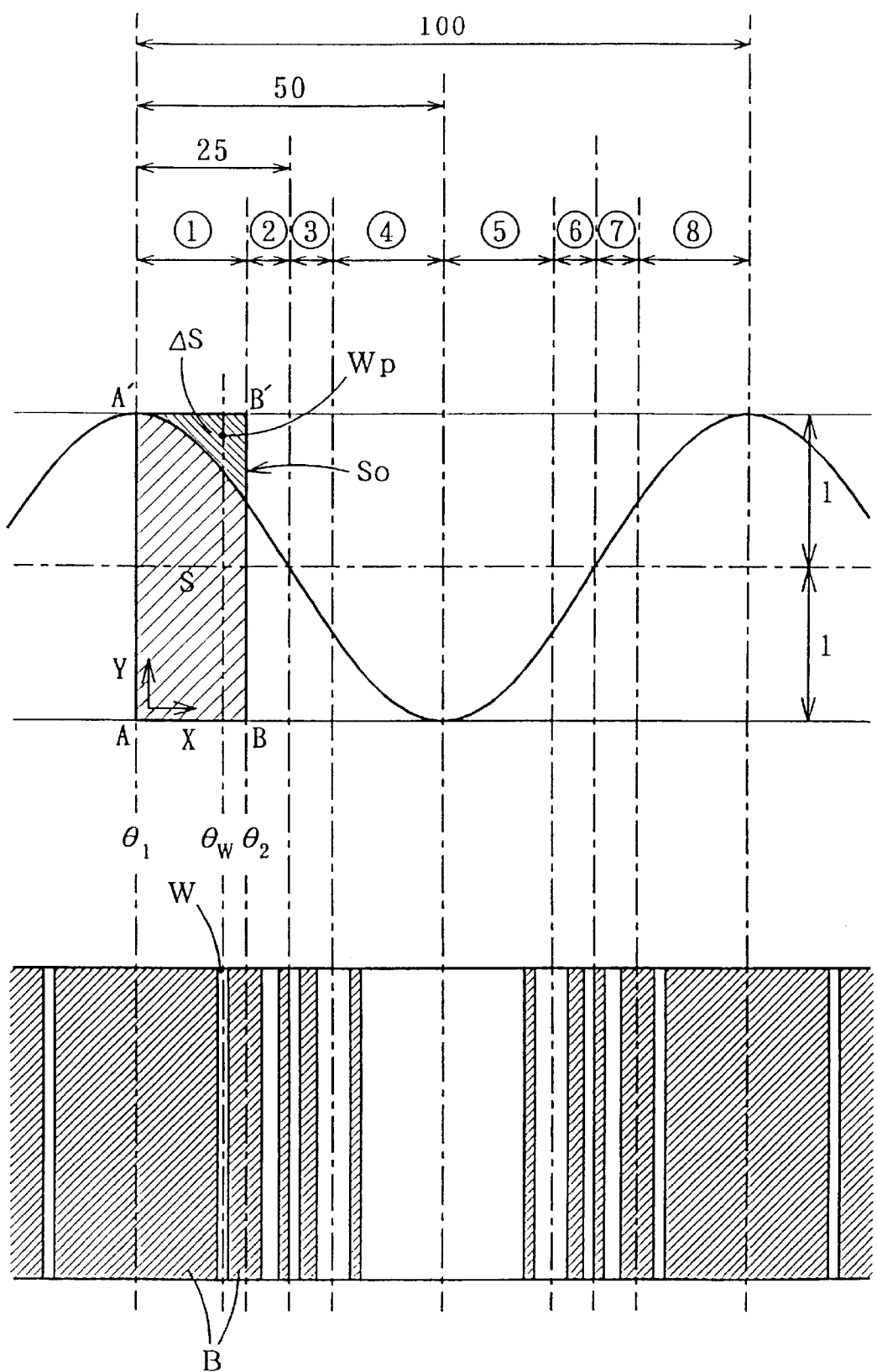
FIG. 4 is a view showing a method of forming the black and white binary pattern of FIG. 3.

First, as shown in FIG. 4, the ordinates of a sine wave are set. Namely, a peak of the sine wave is set as the origin of X axis, whereas a valley of the sine wave is set as the origin of Y axis. Then, the wavelength of this sine wave is set to 100 $\mu$m, whereas the amplitude thereof is set to 1 (total amplitude is set to 2).

Subsequently, each cycle of the sine wave is divided into eight sections. Namely, each cycle is equally divided into four sections of $\pi/2$, and then thus formed sections are each divided into two at positions shifted toward $\pi/2$ and $3\pi/2$. Here, the black and white binary pattern is set to a pattern symmetrical about the position at $\pi$, in which black and white are inverted about positions at $\pi/2$ and $3\pi/2$.

Then, each of the resulting eight sections is divided into band-like regions with a black and white binary pattern according to the ratio between the area S of the sine wave and the area So of a rectangular wave having the same total amplitude as that of the sine wave.

This dividing process is specifically carried out as follows:

First, in the section from $\theta_1$ to $\theta_2$ shown in FIG. 4, the area So of the rectangular wave (quadrangle ABB'A') and the area S of the sine wave are calculated:

$$So = 2(\theta_2 - \theta_1)$$

$$S = \int_{\theta_1}^{\theta_2} (\cos\theta + 1) d\theta$$

$$= [\sin\theta + \theta]_{\theta_1}^{\theta_2}$$

$$= \sin\theta_2 + \theta_2 - \sin\theta_1 - \theta_1$$

Subsequently, the difference $\Delta S$ between the area So and the area S is calculated:

$$\Delta S = So - S$$

$$= 2(\theta_2 - \theta_1) - (\sin\theta_2 + \theta_2 - \sin\theta_1 - \theta_1)$$

$$= \theta_2 - \theta_1 - \sin\theta_2 + \sin\theta_1$$

Since $S > So/2$ within the section from $\theta_1$ to $\theta_2$, this section would mainly be constituted by black regions B. Therefore, the whole section from $\theta_1$ to $\theta_2$ is once set to a black region B, and then a white region W is formed so as to cut into an intermediate portion of the black region B like a band. Here, the white region W is formed so as to pass the center of gravity Wp of the $\Delta S$ region (differential region), whereas the width of the white region W is set such that the area of the white region W equals the area of $\Delta S$. The X-coordinate position $\theta_w$ of center of gravity Wp is calculated as a position where $$\Delta S(\theta_1 \text{ to } \theta_w) = \Delta S(\theta_1 \text{ to } \theta_2)/2.$$

Similarly, other sections are divided with black and white binary patterns. As a consequence, the above-mentioned projection grating 14 is formed as a pattern projection measurement grating having a pseudo sine wave density distribution constituted by a black and white binary pattern.

When the projection grating 14 is formed as mentioned above, the white regions W and black regions B each would have a very narrow width as small as 1.69 $\mu$m. Consequently, concerning the white regions W, it is necessary to consider the influence of diffraction of light transmitted therethrough.

Therefore, the F (lens diameter ratio) value necessary for the whole light expanded upon diffraction to be made incident on the projection lens 16 is calculated first.

Figure 5:
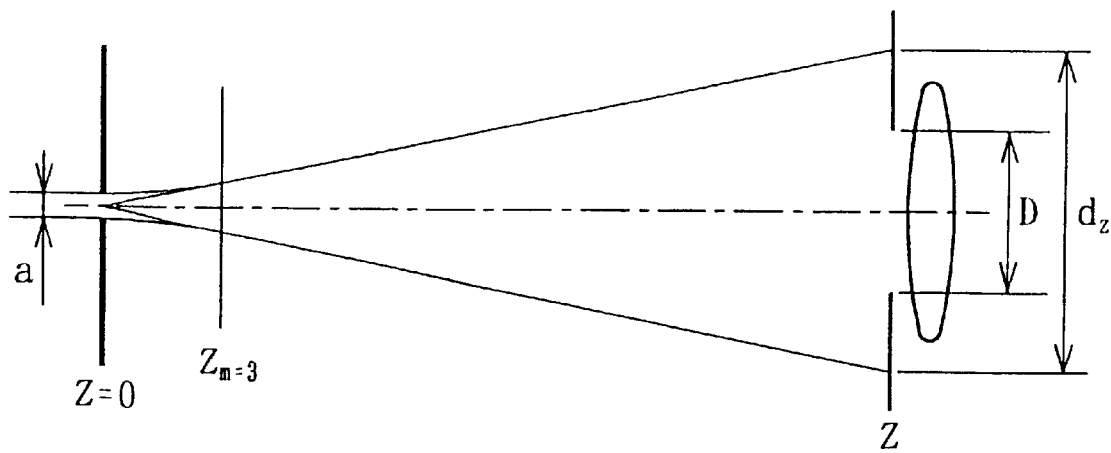
FIG. 5 is a view showing the state of diffraction of transmitted light in a white region in the black and white binary pattern of FIG. 3.

Since the distance between the projection grating 14 and the projection lens 16 is sufficiently large, the projection grating 14 becomes a Fraunhofer diffraction region. Therefore, an optical system such as that shown in FIG. 5 is considered.

In this drawing, a is the slit width (width of the white region W), Z is the distance to the lens (projection lens 16), and dz is the size of the diffracted light at the pupil position of the lens. The wavelength of the light employed is assumed be $\lambda$. When $$Z = ma^2/2\lambda$$

holds true, the diameter of zero-order expansion (dark ring) d would satisfy $d \cong 2a$. The diffraction up to the vicinity of this level is Fresnel diffraction.

Now, assuming that, at a place very far from m=3, the expansion of light at m=3 propagates as it is with reference to the grating position, the size dz of diffracted light at the pupil position of the lens can be expressed by $$dz = d_{m-3} \cdot Z/Z_{m-3}.$$

Figure 6:
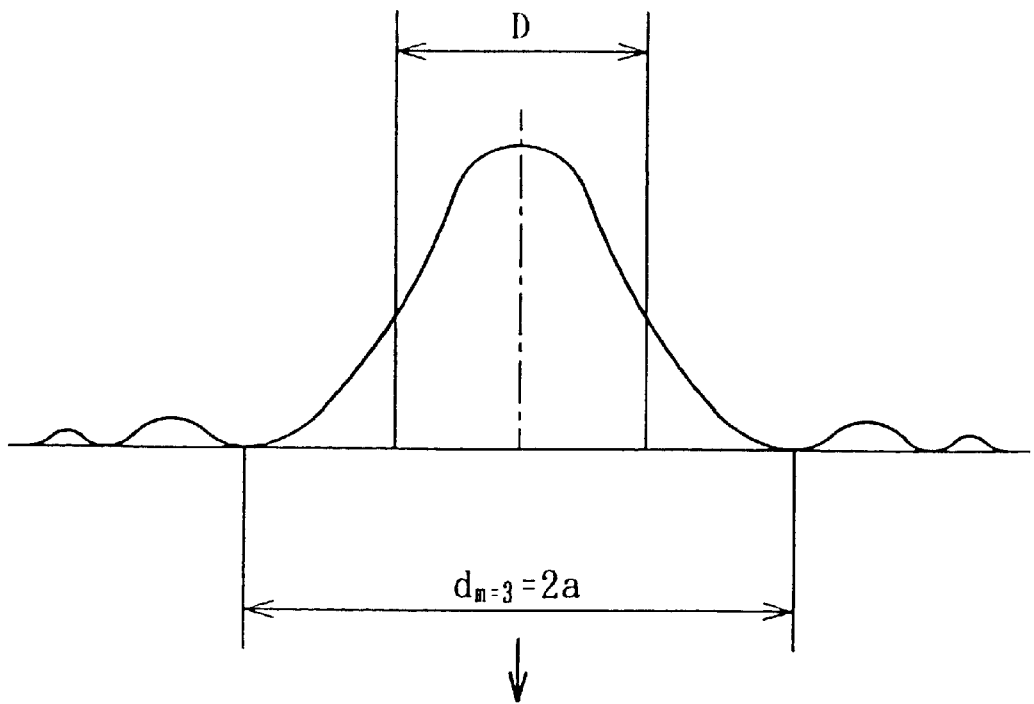
FIG. 6 is a view showing the state of Fraunhofer diffraction of the transmitted light of FIG. 5.

As shown in FIG. 6, since $$d_{m-3} = 2a,$$

$$dz = 2a \cdot Z/Z_{m-3}.$$

Therefore, letting the focal length be f, the necessary F value is expressed by $$F = f/dz$$
$$= f/(2a \cdot Z/Z_{m-3}).$$

In practice, the effective diameter of the lens is defined by the pupil diameter D indicated in FIGS. 5 and 6 as $$F = f/D,$$

which must be taken into account when setting the value of F.

Table 1 lists data used when necessary F values are thus calculated for various kinds of slit width a.

TABLE 1

| a (μm) | $Z_{m-3}$ (μm) | $Z/Z_{m-3}$ | $d_{m-3} = 2a$ (μm) | $d_z$ (mm) | Necessary F |
|---|---|---|---|---|---|
| 1 | 2.7 | 31111 | 2 | 62 | 1.3 |
| 1.5 | 6.1 | 13690 | 3 | 41 | 2 |
| 2 | 11 | 7700 | 4 | 31 | 2.6 |
| 5 | 68 | 1232 | 10 | 12.5 | 6.5 |
| 6 | 92 | 857 | 12 | 10.3 | 7.8 |
| 7.5 | 153 | 549 | 15 | 8 | 10 |
| 10 | 273 | 308 | 20 | 6.2 | 13 |
| 100 | 27300 | 3 | 200 | 0.6 | 133 |

Wavelength: λ = 0.55 μm, Z = 84 mm, f = 80

From this table, it can be seen that, for example, when a lens with F=6.5 is employed, it is substantially usable in practice without any correction in the vicinity of a=5 μm or greater, and no problem occurs at a=6 μm. If the slit width a (i.e., width of the white region W in the black and white binary pattern) is narrower than 5 μm, however, it is desirable that the slit width a be corrected to a value greater than the designed value so as to enhance the quantity of light incident on the lens from the viewpoint of making the pseudo sine wave density distribution as a density distribution closer to the sine wave.

Figure 7:
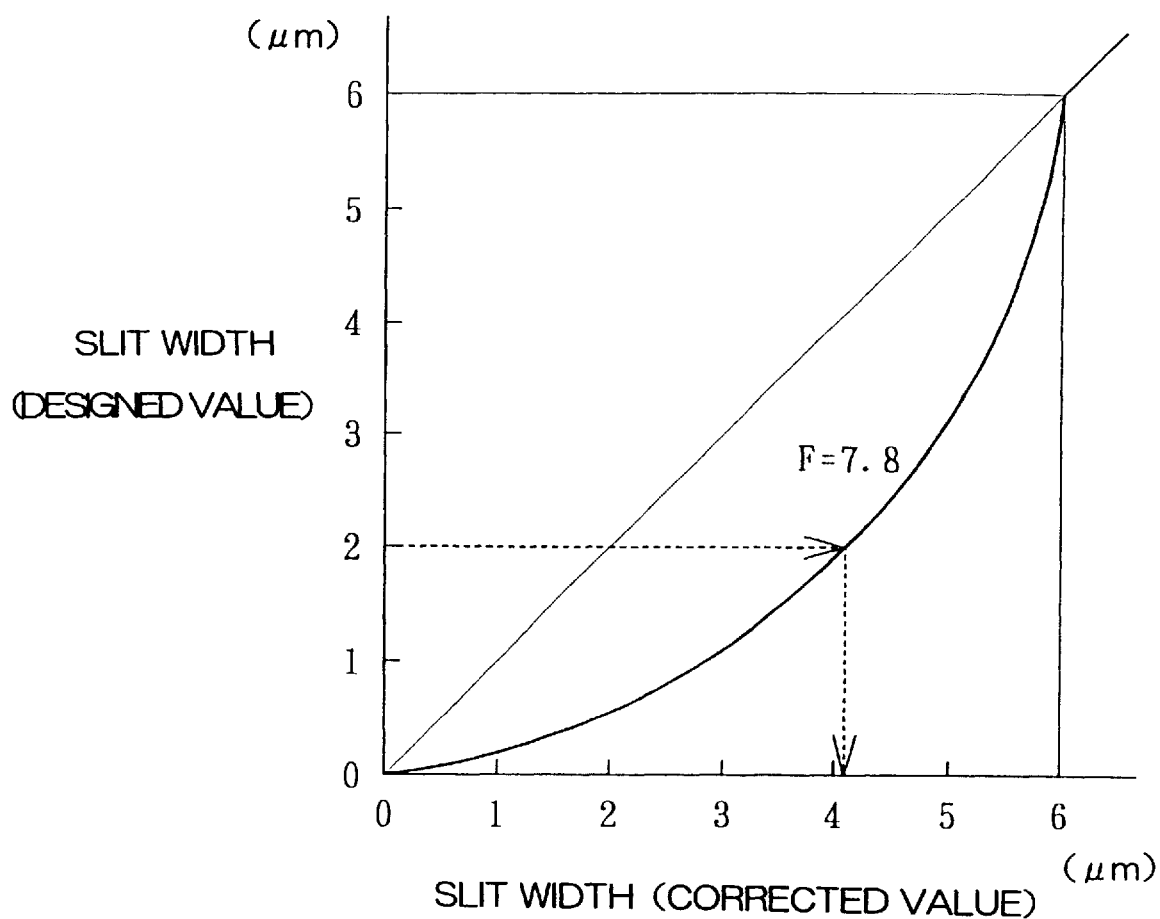
FIG. 7 is a view showing a specific example of a method of correcting the enhancement in width of the above-mentioned white region.

FIG. 7 is a view showing a method of correcting the enhancement in the slit width a when the lens with F=7.8 is used, as an example thereof.

Setting a correction curve such as that shown in this drawing can replace the designed value of slit width with its corrected value. Here, as can also be seen from Table 1, no correction is necessary at a slit width a of 6 μm or greater when the lens with F=7.8 is used.

As explained in detail in the foregoing, while the projection grating 14 and observation reference grating 24 in accordance with this embodiment each have a pseudo sine wave density distribution constituted by a black and white binary pattern, each cycle of the total amplitude of the sine wave is divided into eight sections, and each section is divided into white regions W and black regions B according to the ratio between the area S of the sine wave and the area So of the rectangular wave having the same total amplitude as that of the sine wave in this section, so as to constitute the above-mentioned black and white binary pattern, whereby the pseudo sine wave density distribution can be made as a density distribution near the sine wave.

Also, since the black and white binary pattern can thus be constituted by a simple pattern, the efficiency in operation of the pattern forming apparatus can be enhanced, whereby the manufacturing cost of the projection grating 14 and observation reference grating 24 can be reduced.

The black and white binary pattern can be formed by a general manufacturing method such as electron beam lithography, etching using a lithography technique, or the like.

Also, in this embodiment, since the above-mentioned black and white binary pattern is formed with such a density that it cannot be resolved by the resolving power of the projection lens 16, it is possible to eliminate the fear of moire fringes with pitches different from the original pitches accidentally occurring due to the aimed pseudo sine wave density distribution.

Also, in this embodiment, since the dividing of the white regions W and black regions B in each section is effected by forming a band-like black region B (or white region W) which cuts into a white region W (or black region B) so as to pass the center of gravity Wp of the differential region, the pseudo sine wave density distribution can be made as a density distribution closer to a sine wave.

Further, in this embodiment, since the above-mentioned black and white binary pattern is set to a pattern symmetrical about the position at π, in which black and white are inverted about positions at π/2 and 3π/2, the black and white binary pattern can be formed easily.

Also, in this embodiment, since the width of the white region W is corrected, according to the degree of diffraction of light transmitted therethrough, to a value greater than the width set by the above-mentioned ratio, the quantity of light incident on the projection lens 16 can be prevented from running short due to the diffraction of transmitted light caused by the narrow designed value of the white region W.

Though the above-mentioned embodiment explains the case where the pattern projection measurement grating constitutes the projection grating 14 and observation reference grating 24 of the moire apparatus, a configuration similar to this embodiment can be employed in pattern projection measurement gratings used in other apparatus, whereby similar operations and effects can be obtained.

The pattern projection measurement grating in accordance with the present invention has a pseudo sine wave density distribution constituted by a black and white binary pattern, in which each cycle of the total amplitude of the sine wave is divided into predetermined sections, and each section is divided into white and black regions according to a ratio between the area of the sine wave and the area of a rectangular wave having the same total amplitude as that of the sine wave in this section, so as to constitute the black and white binary pattern, whereby the pseudo sine wave density pattern can be made as a density distribution close to a sine wave. Since the black and white binary pattern can be constituted by a simple pattern, the efficiency in operation of the pattern forming apparatus can be raised, whereby the manufacturing cost of the pattern projection measurement grating can be reduced.

What is claimed is:

1. A pattern projection measurement grating having a pseudo sine wave density distribution constituted by a black and white binary pattern, wherein predetermined sections dividing each cycle of a total amplitude of a sine wave are provided, each section being divided into black and white regions according to a ratio between an area of the sine wave and an area of a rectangular wave having the same total amplitude as that of said sine wave in said section, so as to constitute said black and white binary pattern.

2. A pattern projection measurement grating according to claim 1, wherein said black and white binary pattern is formed with a density which cannot be resolved by a resolving power of a projection measurement lens.

3. A pattern projection measurement grating according to claim 1, wherein said black and white regions are divided by forming a black or white band-like region which passes near a center of gravity of a differential region between said rectangular wave and said sine wave.

4. A pattern projection measurement grating according to claim 1, wherein said black and white binary pattern is set to a pattern symmetrical about a position at $\pi$, in which black and white are inverted about positions at $\pi/2$ and $3\pi/2$.

5. A pattern projection measurement grating according to claim 1, wherein said black and white regions are divided like a band, said white region having a width corrected, according to the degree of diffraction of light transmitted through said white region, to a width greater than the width set by said ratio.

* * * * *